United States Patent
Luick et al.

(10) Patent No.: US 8,169,439 B2
(45) Date of Patent: May 1, 2012

(54) SCALAR PRECISION FLOAT IMPLEMENTATION ON THE "W" LANE OF VECTOR UNIT

(75) Inventors: David Arnold Luick, Rochester, MN (US); Eric Oliver Mejdrich, Rochester, MN (US); Adam James Muff, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/877,205

(22) Filed: Oct. 23, 2007

(65) Prior Publication Data

US 2009/0106527 A1    Apr. 23, 2009

(51) Int. Cl.
*G06T 15/20* (2011.01)

(52) U.S. Cl. ........ 345/502; 345/421; 345/505; 711/214; 712/2; 712/7; 712/9

(58) Field of Classification Search .................. 711/214; 712/2, 7, 9, 222; 345/421, 502, 505
See application file for complete search history.

(56) References Cited

U.S. PATENT DOCUMENTS

| | | | |
|---|---|---|---|
| 4,685,076 A | 8/1987 | Yoshida | |
| 5,019,968 A | 5/1991 | Wang et al. | |
| 5,261,113 A | 11/1993 | Jouppi | |
| 5,303,358 A | 4/1994 | Baum | |
| 6,141,673 A | 10/2000 | Thayer et al. | |
| 6,178,500 B1 | 1/2001 | Roth | |
| 6,842,850 B2 * | 1/2005 | Ganapathy et al. | ........... 712/221 |
| 6,857,061 B1 * | 2/2005 | Liao et al. | ........ 712/222 |
| 6,891,538 B1 | 5/2005 | Tannenbaum | |
| 7,339,837 B2 | 3/2008 | Oberlaender et al. | |
| 7,461,117 B2 * | 12/2008 | Trong et al. | .......... 708/501 |
| 2003/0037221 A1 | 2/2003 | Gschwind et al. | |
| 2003/0067473 A1 | 4/2003 | Taylor et al. | |
| 2003/0208733 A1 | 11/2003 | Sokolov | |
| 2004/0015682 A1 | 1/2004 | Barlow et al. | |
| 2004/0267861 A1 | 12/2004 | Gerwig et al. | |
| 2005/0240644 A1 | 10/2005 | Van Berkel et al. | |
| 2005/0251644 A1 | 11/2005 | Maher et al. | |
| 2006/0227966 A1 * | 10/2006 | Knowles | ................. 380/42 |
| 2007/0198815 A1 | 8/2007 | Liu et al. | |
| 2008/0079712 A1 | 4/2008 | Mejdrich et al. | |
| 2008/0079713 A1 | 4/2008 | Mejdrich et al. | |

(Continued)

FOREIGN PATENT DOCUMENTS

WO    01/98891    12/2001

(Continued)

OTHER PUBLICATIONS

Linley Gwennap, "IBM Crams Power2 onto Single Chip", Microprocessor Report, Aug. 26, 1996, vol. 10, No. 11, pp. 1-3.*

(Continued)

*Primary Examiner* — William M Treat
(74) *Attorney, Agent, or Firm* — Patterson & Sheridan LLP

(57) ABSTRACT

Embodiments of the invention are generally related to image processing, and more specifically to vector units for supporting image processing. A combined vector/scalar unit is provided wherein one or more processing lanes of the vector unit are used for performing scalar operations. An integrated register file is also provided for storing vector and scalar data. Therefore, the transfer of data to memory to exchange data between independent vector and scalar units is obviated and a significant amount of chip area is saved.

20 Claims, 8 Drawing Sheets

$A = (x_a, y_a, z_a)$
$B = (x_b, y_b, z_b)$ $$N = A \times B = \begin{vmatrix} \hat{x} & \hat{y} & \hat{z} \\ x_a & y_a & z_a \\ x_b & y_b & z_b \end{vmatrix} = \begin{matrix} \hat{x}(y_a z_b - y_b z_a) + \\ \hat{y}(x_b z_a - x_a z_b) + \\ \hat{z}(x_a y_b - x_b y_a) \end{matrix}$$

U.S. PATENT DOCUMENTS

| | | | |
|---|---|---|---|
| 2008/0082783 | A1 | 4/2008 | Mejdrich et al. |
| 2008/0082784 | A1 | 4/2008 | Mejdrich et al. |
| 2009/0106525 | A1 | 4/2009 | Luick et al. |
| 2009/0106526 | A1 | 4/2009 | Luick et al. |
| 2009/0106527 | A1 | 4/2009 | Luick et al. |
| 2009/0150648 | A1 | 6/2009 | Mejdrich et al. |

FOREIGN PATENT DOCUMENTS

| | | |
|---|---|---|
| WO | 03/100602 | 12/2003 |

OTHER PUBLICATIONS

Tyler at al., AltiVec: Bringing Vector Technology to the PowerPC Processor Family, IEEE Performance, Computing and Communications Conference, Feb. 10-12, 1999, pp. 437-444.*

Dal Poz, et al. "A High Performance Processor for Real-Time Ray-Tracing Image Rendering" (Aug. 14, 2005) IEEE, 48th Midwest Symposium on Circuits & Systems, pp. 867-870.

"Product Brief T1P2000 Video Processor," Telairity, (2005) pp. 1-2. Telairity Semiconductor.

Office Action History of pending U.S. Appl. No. 11/536,146, dates ranging from Apr. 29, 2009 to Jun. 8, 2010.

Office Action History of pending U.S. Appl. No. 11/876,056, dates ranging from Feb. 19, 2010 to Aug. 10, 2010.

Office Action History of pending U.S. Appl. No. 11/951,416, dates ranging from Feb. 24, 2010 to Oct. 19, 2010.

Office Action History of pending U.S. Appl. No. 11/924,980, dates ranging from Mar. 25, 2010 to Aug. 20, 2010.

Office Action History of abandoned U.S. Appl. No. 12/048,324, dates ranging from Nov. 27, 2009 to Nov. 27, 2009.

* cited by examiner $$A = (x_a, y_a, z_a)$$
$$B = (x_b, y_b, z_b)$$

$$N = A \times B = \begin{vmatrix} \hat{x} & \hat{y} & \hat{z} \\ x_a & y_a & z_a \\ x_b & y_b & z_b \end{vmatrix} = \begin{array}{l} \hat{x}(y_a z_b - y_b z_a) + \\ \hat{y}(x_b z_a - x_a z_b) + \\ \hat{z}(x_a y_b - x_b y_a) \end{array}$$

```
vadd v1, v35, v36  ⎫
storev v1, $v2     ⎬ 1001
                   ⎭
loadf f1, $v2.y    ⎫
fadd f1, f1, f4    ⎬ 1002
storef v1 $v2.y    ⎭
loadv v1, $v2      ⎫
vadd v45, v1, v36  ⎬ 1003
```

FIG. 10B

```
vdd     v33,   v35,   v36
vpermi  v1,    v33,   w<-y
fadd    f1,    f1,    f4
vpermi  v33,   v1,    y<-w
vadd    v45,   v33,   v36
```

SCALAR PRECISION FLOAT IMPLEMENTATION ON THE "W" LANE OF VECTOR UNIT

CROSS-REFERENCE TO RELATED APPLICATIONS

This application is related to U.S. patent application Ser. No. 11/876,056, entitled SCALAR FLOAT REGISTER OVERLAY ON VECTOR REGISTER FILE FOR EFFICIENT REGISTER ALLOCATION AND SCALAR FLOAT AND VECTOR REGISTER SHARING, filed Oct. 22, 2007, by David Arnold Luick et al. This related patent application is herein incorporated by reference in its entirety.

BACKGROUND OF THE INVENTION

1. Field of the Invention

The present invention is generally related to the field of image processing, and more specifically to vector units for supporting image processing.

2. Description of the Related Art

Image processing involves performing both, vector and scalar operations. Vector operations include performing operations on one or more vectors, such as, for example, dot product operations and cross product operations. Scalar operations include addition, subtraction, multiplication, division, and the like. Accordingly, processors that process images include an independent vector unit for performing vector operations and an independent scalar unit for performing scalar operations.

Each of the vector and scalar units typically have their own respective register file. The register file contains data operated on by the associated vector or scalar unit. The register file is also used to store results of operations performed by the respective vector or scalar unit. If results of one unit are needed for an operation performed by the other unit, the results must be stored to memory first, and then loaded into the respective register file of the other unit.

SUMMARY OF THE INVENTION

The present invention is generally related to the field of image processing, and more specifically to vector units for supporting image processing.

One embodiment of the invention provides a processor generally comprising a register file comprising a plurality of registers, wherein the plurality of registers comprise vector and scalar data, and a processing unit communicably coupled with the register file. The processing unit generally comprises a plurality of processing lanes configured to update data contained in the register file by executing vector and scalar instructions, wherein the scalar instructions are processed in a predetermined one or more processing lanes of the plurality of processing lanes of the vector unit.

Another embodiment of the invention provides a method for executing instructions. The method generally comprises issuing a vector instruction to a processing unit, wherein the vector instruction is processed in one or more processing vector processing lanes of the processing unit configured to process the vector instruction, and issuing a scalar instruction to the processing unit, wherein the scalar instruction is processed by at least one scalar processing lane of the vector unit configured to process the scalar instruction.

Yet another embodiment of the invention provides a system comprising a plurality of processors communicably coupled with one another, each processor generally comprising a register file comprising a plurality of registers, wherein the plurality of registers comprise vector and scalar data. The system further comprises a processing unit communicably coupled with the register file, the processing unit comprising a plurality of processing lanes configured to update data contained in the register file by executing vector and scalar instructions, wherein the scalar instructions are processed in a predetermined one or more processing lanes of the plurality of processing lanes of the vector unit.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 9 illustrates a detailed view of an exemplary register file according to an embodiment of the invention.

FIG. 10A illustrated exemplary operations that may be performed during image processing.

FIG. 10B illustrates exemplary instructions for performing the operations of FIG. 10A using independent vector and scalar units.

FIG. 10C illustrates exemplary instructions for performing the operations of FIG. 10A using an integrated vector/scalar unit and integrated register file.

DETAILED DESCRIPTION OF THE PREFERRED EMBODIMENTS

Figure 1:
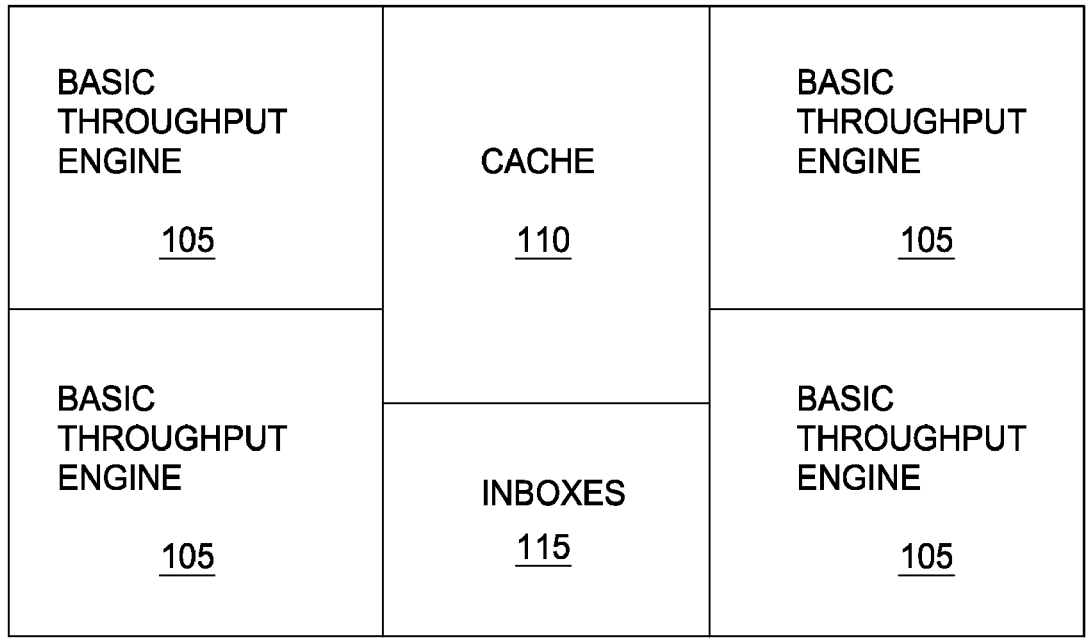
FIG. 1 illustrates a multiple core processing element, according to one embodiment of the invention.

Embodiments of the invention are generally related to image processing, and more specifically to vector units and register files for supporting image processing. A combined vector/scalar unit is provided wherein one or more processing lanes of the vector unit are used for performing scalar operations. An integrated register file is also provided for storing vector and scalar data. Therefore, the transfer of data to memory to exchange data between independent vector and scalar units is obviated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Image Processing

The process of rendering two-dimensional images from three-dimensional scenes is commonly referred to as image processing. A particular goal of image processing is to make two-dimensional simulations or renditions of three-dimensional scenes as realistic as possible. This quest for rendering more realistic scenes has resulted in an increasing complexity of images and innovative methods for processing the complex images.

Two-dimensional images representing a three-dimensional scene are typically displayed on a monitor or some type of display screen. Modern monitors display images through the use of pixels. A pixel is the smallest area of space which can be illuminated on a monitor. Most modern computer monitors use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One method for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of objects in the scene to be rendered. As image processing becomes more realistic, rendered scenes become more complex. Therefore, rasterization suffers as image processing evolves, because rasterization scales directly with complexity.

Another method for rendering a real world three-dimensional scene onto a two-dimensional monitor using pixels is called ray tracing. The ray tracing technique traces the propagation of imaginary rays, which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors, for example, the effect of light sources, are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increasing scene complexity better than rasterization. Ray tracing scales logarithmically with scene complexity. This is due to the fact that the same number of rays may be cast into a scene, even if the scene becomes more complex. Therefore, ray tracing does not suffer in terms of computational power requirements as scenes become more complex unlike rasterization.

Ray tracing generally requires a large number of floating point calculations, and thus increased processing power, required to render scenes. This may particularly be true when fast rendering is needed, for example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Image processing using, for example, ray tracing, may involve performing both vector and scalar math. Accordingly, hardware support for image processing may include vector and scalar units configured to perform a wide variety of calculations. The vector and scalar operations, for example, may trace the path of light through a scene, or move objects within a three-dimensional scene. A vector unit may perform operations, for example, dot products and cross products, on vectors related to the objects in the scene. A scalar unit may perform arithmetic operations on scalar values, for example, addition, subtraction, multiplication, division, and the like. The vector and scalar units may be pipelined to improve performance.

Image processing computations may involve heavy interaction between vector and scalar units. Because the prior art implements vector and scalar units that can be independently issued to, and having their own respective register files, transferring data between the units is usually very inefficient. For example, a scalar unit may load data from memory into its associated register file to perform a scalar operation. The results of the calculation may then be stored back in memory from the register file associated with the scalar unit. Subsequently, the results of the scalar operation stored in memory may be loaded into a separate register file associated with a vector unit to perform a vector operation.

The transfer of data to and from memory to transfer the data between scalar and vector units, and the dependencies between instructions may introduce significant delays that slow down processing of images, thereby adversely affecting the ability to render realistic images and animation. Embodiments of the invention combine the vector and scalar units into a single unit capable of performing both vector and scalar operations. Embodiments also provide a register file capable of storing both vector and scalar data.

Exemplary System

FIG. 1 illustrates an exemplary multiple core processing element 100, in which embodiments of the invention may be implemented. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be a memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
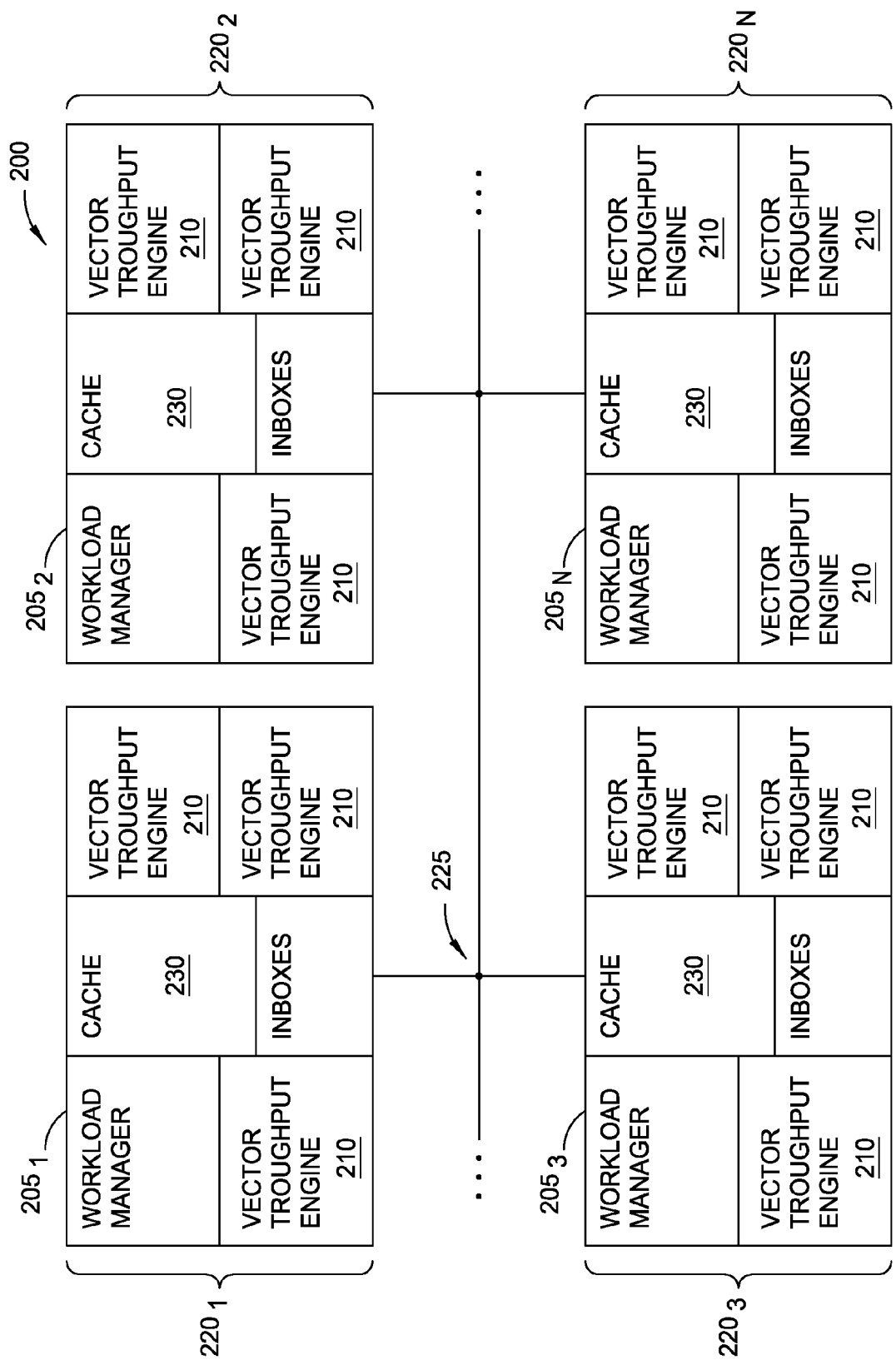
FIG. 2 illustrates a multiple core processing element network, according to an embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
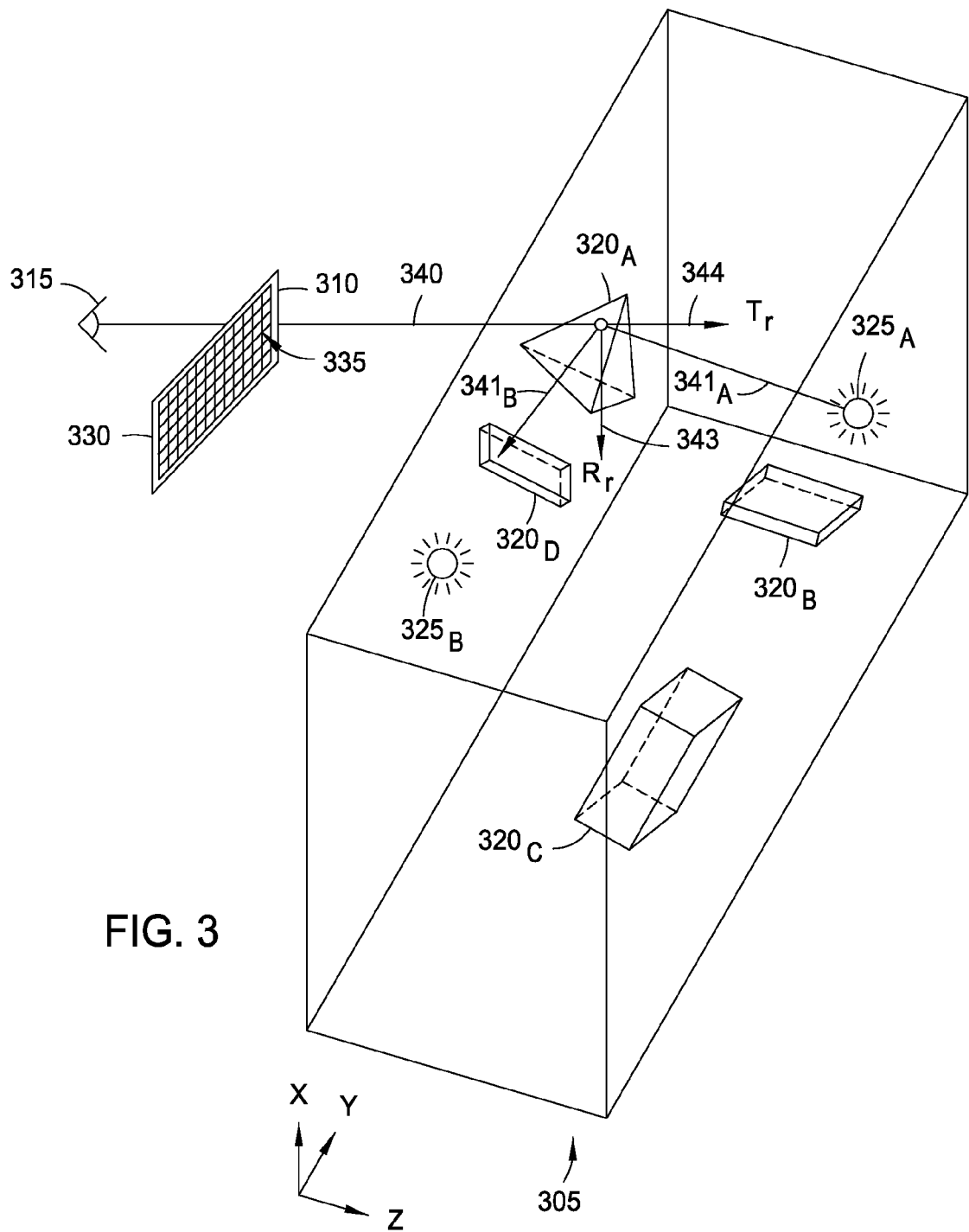
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object 320$_A$ which the original ray 340 intersected.

The total contribution of color and light of all secondary rays (e.g., shadow rays, transmitted rays, reflected rays, etc.) will result in the final color of the pixel through which the original ray passed.

Vector Operations

Processing images may involve performing one or more vector operations to determine, for example, intersection of rays and objects, generation of shadow rays, reflected rays, and the like. One common operation performed during image processing is the cross product operation between two vectors. A cross product may be performed to determine a normal vector from a surface, for example, the surface of a primitive of an object in a three dimensional scene. The normal vector may indicate whether the surface of the object is visible to a viewer.

Figures 4, 5:
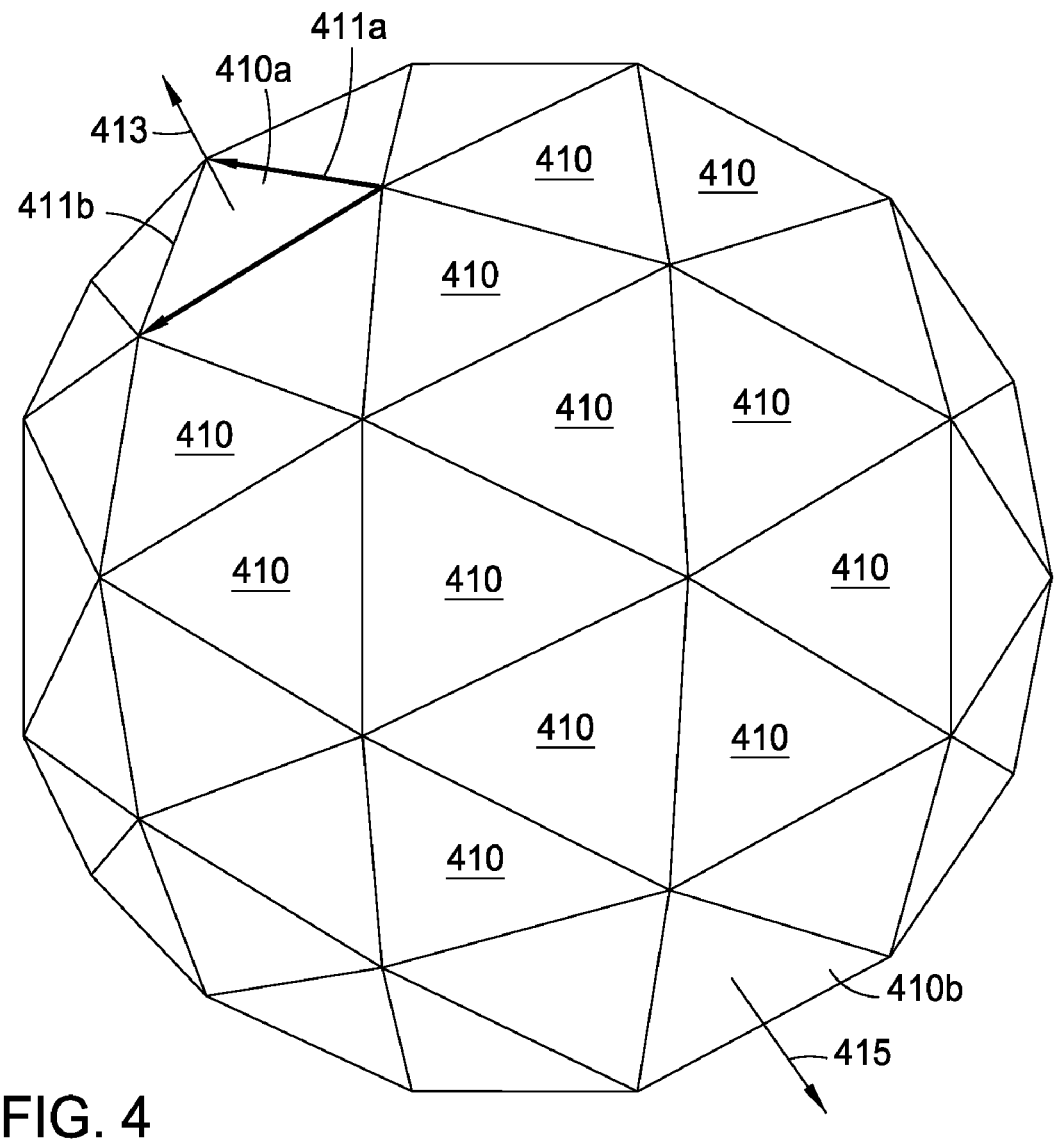
FIG. 4 illustrates a detailed view of an object to be rendered on a screen, according to an embodiment of the invention.
FIG. 5 illustrates a cross product operation.

As previously described, each object in a scene may be represented as a plurality of primitives connected to one another to form the shape of the object. For example, in one embodiment, each object may be composed of a plurality of interconnected triangles. FIG. 4 illustrates an exemplary object 400 composed of a plurality of triangles 410. Object 400 may be a spherical object, formed by the plurality of triangles 410 in FIG. 4. For purposes of illustration a crude spherical object is shown. One skilled in the art will recognize that the surface of object 400 may be formed with a greater number of smaller triangles 410 to better approximate a curved object.

In one embodiment of the invention, the surface normal for each triangle 410 may be calculated to determine whether the surface of the triangle is visible to a viewer 450. To determine the surface normal for each triangle, a cross product operation may be performed between two vectors representing two sides of the triangle. For example, the surface normal 413 for triangle 410a may be computed by performing a cross product between vectors 411a and 411b.

The normal vector may determine whether a surface, for example, the surface of a primitive, faces a viewer. Referring to FIG. 4, normal vector 413 points in the direction of viewer 450. Therefore, triangle 410 may be displayed to the user. On the other hand, normal vector 415 of triangle 410b points away from viewer 450. Therefore, triangle 410b may not be displayed to the viewer.

FIG. 5 illustrates a cross product operation between two vectors A and B. As illustrated, vector A may be represented by coordinates [$x_a$, $y_a$, $z_a$], and vector B may be represented by coordinates [$x_b$, $y_b$, $z_b$]. The cross product A×B results in a vector N that is perpendicular (normal) to a plane comprising vectors A and B. The coordinates of the normal vector, as illustrated are [($y_a z_b - y_b z_a$), ($x_b z_a - x_a z_b$), ($x_a y_b - x_b y_a$)]. One skilled in the art will recognize that vector A may correspond to vector 411a in FIG. 4, vector B may correspond to vector 411b, and vector N may correspond to normal vector 413.

Another common vector operation performed during image processing is the dot product operation. A dot product operation may be performed to determine rotation, movement, positioning of objects in the scene, and the like. A dot product operation produces a scalar value that is independent of the coordinate system and represents an inner product of the Euclidean space. The equation below describes a dot product operation performed between the previously described vectors A and B:

$$A \cdot B = x_a \cdot x_b + y_a \cdot y_b + z_a \cdot z_b$$

Hardware Support for Image Processing

As described earlier, a vector throughput engine (VTE), for example VTE 210 in FIG. 2, may perform operations to determine whether a ray intersects with a primitive, and determine a color of a pixel through which a ray is passed. The operations performed may include a plurality of vector and scalar operations. Accordingly, VTE 210 may be configured to issue instructions to a vector unit for performing vector operations.

Figure 6:
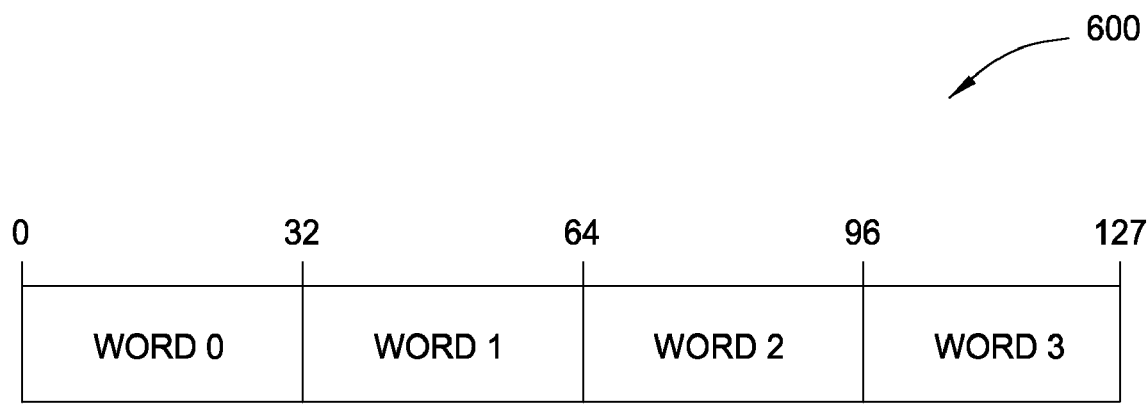
FIG. 6 illustrates a register according to an embodiment of the invention.

Vector processing may involve issuing one or more vector instructions. The vector instructions may be configured to perform an operation involving one or more operands in a first register and one or more operands in a second register. The first register and the second register may be a part of a register file associated with a vector unit. FIG. 6 illustrates an exemplary register 600 comprising one or more operands. As illustrated in FIG. 6, each register in the register file may comprise a plurality of sections, wherein each section comprises an operand.

In the embodiment illustrated in FIG. 6, register 600 is shown as a 128 bit register. Register 600 may be divided into four 32 bit word sections: word 0, word 1, word 2, and word 3, as illustrated. Word 0 may include bits 0-31, word 1 may include bits 32-63, word 2 may include bits 64-97, and word 3 may include bits 98-127, as illustrated. However, one skilled in the art will recognize that register 600 may be of any reasonable length and may include any number of sections of any reasonable length.

Each section in register 600 may include an operand for a vector operation. For example, register 600 may include the coordinates and data for a vector, for example vector A of FIG. 5. Accordingly, word 0 may include coordinate $x_a$, word 1 may include the coordinate $y_a$, and word 2 may include the coordinate $z_a$. Word 3 may include data related to a primitive associated with the vector, for example, color, transparency, and the like. In one embodiment, word 3 may be used to store scalar values. The scalar values may or may not be related to the vector coordinates contained in words 0-2.

Figure 7:
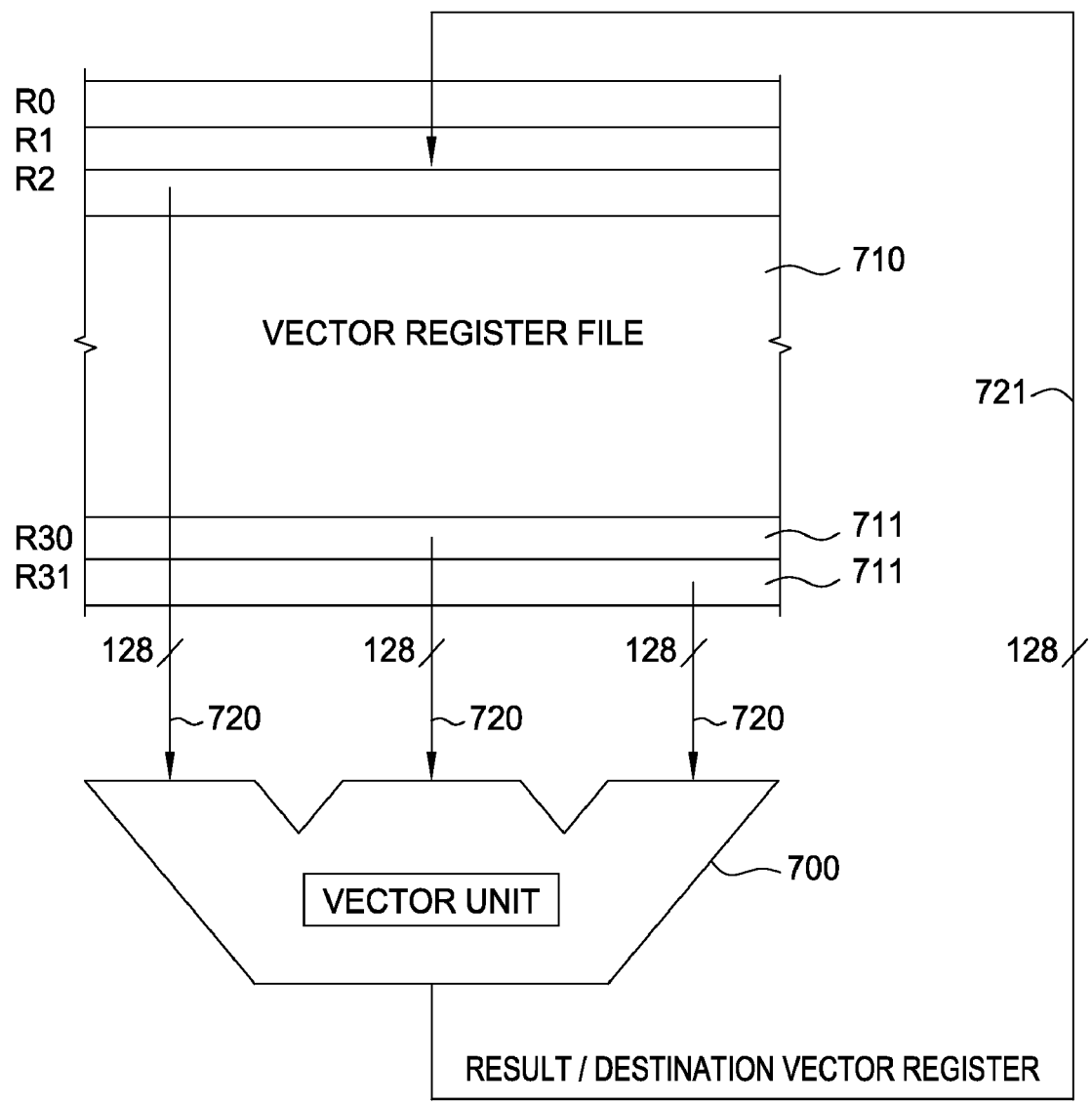
FIG. 7 illustrates a vector unit and a register file, according to an embodiment of the invention.

FIG. 7 illustrates an exemplary vector unit 700 and an associated register file 710. Vector unit 700 may be configured to execute single instruction multiple data (SIMD) instructions. In other words, vector unit 700 may operate on one or more vectors to produce a single scalar or vector result. For example, vector unit 700 may perform parallel operations on data elements that comprise one or more vectors to produce a scalar or vector result.

A plurality of vectors operated on by the vector unit may be stored in register file 710. For example, in FIG. 7, register file 710 provides 32 128-bit registers 711 (R0-R31). Each of the registers 711 may be organized in a manner similar to register 600 of FIG. 6. Accordingly, each register 711 may include vector data, for example, vector coordinates, pixel data, transparency, and the like. Data may be exchanged between register file 710 and memory, for example, cache memory, using load and store instructions. Accordingly, register file 710 may be communicable coupled with a memory device, for example, a Dynamic Random Access memory (DRAM) device.

A plurality of lanes 720 may connect register file 710 to vector unit 700. Each lane may be configured to provide input from a register file to the vector unit. For example, in FIG. 7, three 128 bit lanes connect the register file to the vector unit 700. Therefore, the contents of any 3 registers from register file 710 may be provided to the vector unit at a time.

The results of an operation computed by the vector unit may be written back to register file 710. For example, a 128 bit lane 721 provides a write back path to write results computed by vector unit 700 back to any one of the registers 711 of register file 710.

Figure 8:
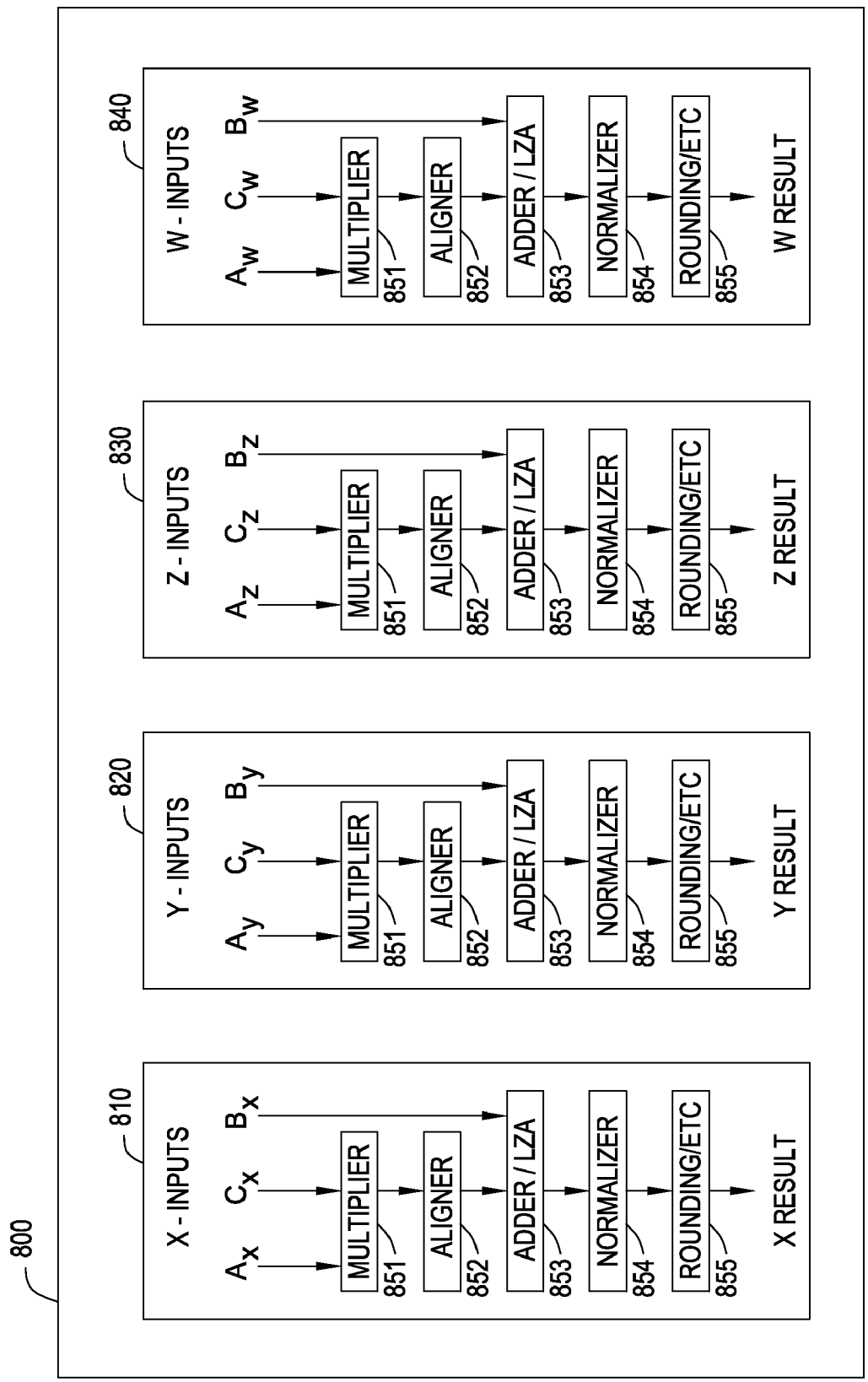
FIG. 8 illustrates a detailed view of a vector unit according to an embodiment of the invention.

FIG. 8 illustrates a detailed view of a vector unit 800. Vector unit 800 is an embodiment of the vector unit 700 depicted in FIG. 7. As illustrated in FIG. 8, vector unit 800 may include a plurality of processing lanes. For example, four processing lanes 810, 820, 830 and 840 are shown in FIG. 8. Each processing lane may be configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane may be pipelined to further improve performance. Accordingly, each processing lane may include a plurality of pipeline stages for performing one or more operations on the operands. For example, each vector lane may include a multiplier 851 for multiplying a pair of operands $A_x$ and $B_x$, $A_y$ and $B_y$, $A_z$ and $B_z$, and $A_w$ and $B_w$, as illustrated in FIG. 8. Each of the operands $A_x$, $B_x$, $A_y$, $B_y$, $A_z$, $B_z$, $A_w$, and $B_w$ may be derived from one of the lanes coupling the register file with the vector unit, for example, lanes 720 in FIG. 7. In one embodiment of the invention, the multiplication of operands may be performed in a first stage of the pipeline as illustrated in FIG. 8.

Each processing lane may also include an aligner for aligning the product computed by multiplier a 851. For example, an aligner 852 may be provided in each processing lane. Aligner 852 may be configured to adjust a decimal point of the product computed by a multiplier 851 to a desirable location in the result. For example, aligner 852 may be configured to shift the bits of the product computed multiplier 851 by one or more locations, thereby putting the product in desired format. While alignment is shown as a separate pipeline stage in FIG. 8, one skilled in the art will recognize that the multiplication and alignment may be performed in the same pipeline stage.

Each processing lane may also include an adder 853 for adding two or more operands. In one embodiment (illustrated in FIG. 8), each adder 853 is configured to receive the product computed by a multiplier, and add the product to another operand C. Operand C, like operands A and B, may be derived from one of the lanes connecting the register file to the vector unit. Therefore, each processing lane may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane may also include a normalizing stage, and a rounding stage, as illustrated in FIG. 8. Accordingly, a normalizer 854 may be provided in each processing lane. Normalizer 854 may be configured to represent a computed value in a convenient exponential format. For example, normalizer may receive the value 0.0000063 as a result of an operation. Normalizer 854 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 852 of lane 810 may be configured to align operand $C_x$, a product computed by the multiplier, or both. Furthermore, embodiments of the invention are not limited to the particular components described in FIG. 8. Any combination of the illustrated components and additional components such as, but not limited to, leading zero adders, dividers, etc. may be included in each processing lane.

In one embodiment of the invention, one or more processing lanes of the vector unit may be used to perform scalar operations. Accordingly, both vector and scalar instructions may be processed by the vector unit. For example, referring to FIG. 8, the processing lane 840 may be used to perform scalar operations. The processing lane 840 may be used for performing scalar instructions, because in one embodiment, lane 840 may be relatively unused while performing vector instructions. Therefore, embodiments of the invention, allow any combination of vector and scalar instructions to be independently issued to the vector unit, thereby improving performance.

Furthermore, by allowing vector units to perform scalar operations, the inefficiency associated with transferring data between vector units and scalar units is avoided. As previously described, conventional processors required the use of memory as a medium to exchange data between vector and scalar units. The exchange of data with memory may be very inefficient. By allowing the scalar and vector operations to be performed by the same processing unit, data may be stored in a unified register file, thereby avoiding the high latencies required to exchange data via memory.

In some embodiments, the scalar processing lane may be modified to include more functional units required to perform scalar operations, such as, for example, floating point status/control registers, more denorm support, and the like. Another advantage of integrating the vector and scalar units is that the integration results in significant area savings in comparison to independent vector and scalar units. The saved space may be used to construct other crucial components and increase chip density.

In some embodiments of the invention, processing vector instructions may utilize only one or more of the plurality of processing lanes. For example, referring to FIG. 8, processing vector instructions may require three lanes, for example, processing lanes 810-830. Therefore, a scalar instruction may be processed in the same cycle as the vector instruction. In other words, a vector instruction may be processed in processing lanes 810-830 and a scalar instruction may be processed in lane 840 in parallel.

Figure 9:
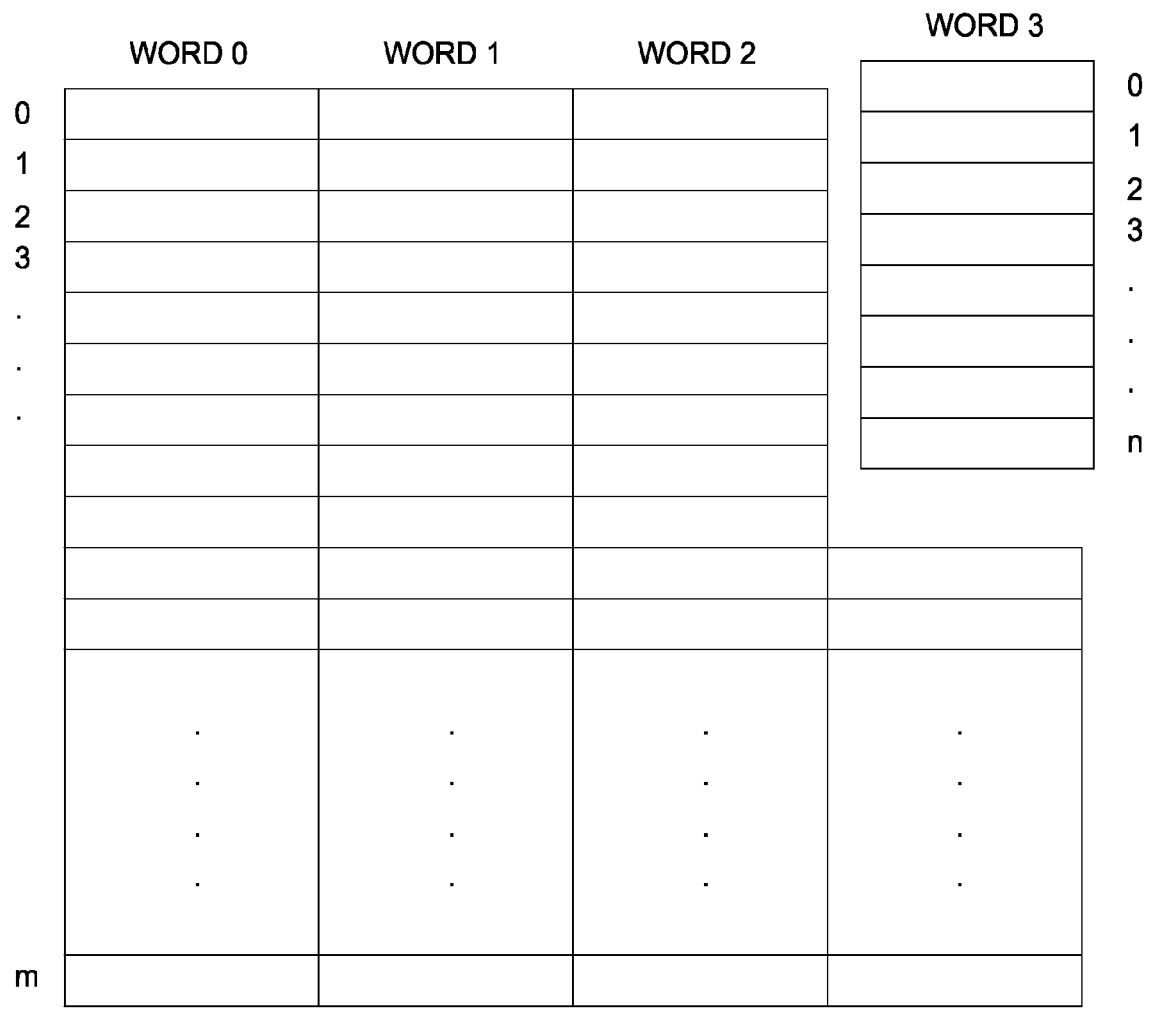

FIG. 9 illustrates an exemplary unified register file 900 according to an embodiment. Register file 900 is a more detailed view of the register file 710 illustrated in FIG. 7. As illustrated in FIG. 9, register file 900 may include a plurality of registers (0-$m$). Each register may be arranged similar to the register 600 illustrated in FIG. 6, i.e., having a plurality of sections (word0-word3). In one embodiment of the invention, one or more sections of one or more registers may be configured to store scalar operands. For example, in FIG. 9, the word 3 sections of the first n registers may be used to store scalar operands. Therefore, by overlaying a scalar register file on to a vector register file, memory accesses to transfer results of vector and scalar operations may be avoided.

Furthermore, a compiler may be able to take advantage of the structure of register file 900 during register allocation to maximize utilization of the register file and to improve instruction scheduling. For example, the compiler may be able to manipulate vector and scalar data in register 900 file using permute instructions rather than issuing long latency move instructions that access memory to exchange data between separate vector and scalar register files.

Another advantage of the integrated vector and scalar units and register files is that the total number of instructions issued to perform a particular task may be reduced. FIG. 10A illustrates an exemplary sequence of operations that may be performed by an image processing processor. As illustrated in FIG. 10A, the operations may include a first operation for adding two vectors v3 and v4, and storing the results in a vector v2. The operations may further include a second operation for adding a scalar operand f2 to the y co-ordinate of vector v2 and a third operation for storing a sum of vectors v2 and v4 in vector v1.

FIG. 10B illustrates exemplary instructions that may be issued to perform the sequence of operations illustrated in FIG. 10A if independent vector and scalar units are used. The exemplary instructions may include the instruction groups 1001-1003. Instruction group 1001 may be associated with the first operation illustrated in FIG. 10A. Because the first operation is a vector operation, the instruction group 1001 may be associated with a vector unit. As illustrated in FIG. 10B, the instruction group 1001 includes a vector add instruction and a store instruction. The store instruction may be configured to store the results of the first operation in memory to make the first operation results available to the scalar unit.

The second group of instructions 1002 may be associated with the second operation in FIG. 10A. Because the second operation involves scalar math, the second group of instructions 1002 may be associated with the scalar unit. As illustrated in FIG. 10B, the second group of instructions 1002 may include a load instruction to load the results of the first operation from memory to a register file associated with the scalar unit. The second group of instructions 1002 also includes a scalar add instruction to perform the second operation and a store instruction to store the results of the second operation from the scalar register file to memory.

The second group of instructions 1003 may be associated with the third operation in FIG. 10A. Because the third operation involves vector math, the third group of instructions 1003 may be associated with the vector unit. As illustrated in FIG. 10B, the third group of instructions 1003 may include a load instruction to load the results computed in the second operation from memory to a vector register file. The third group of instructions 1003 also includes a vector add instruction to perform the third operation. As discussed earlier the load and store instructions illustrated in FIG. 10B may have long latencies that may adversely affect efficient image processing and rendering.

FIG. 10C illustrates exemplary instructions that may be issued to perform the operations of FIG. 10A using an integrated vector/scalar unit and register file. As illustrated in FIG. 10C, load and store instructions are not used because the vector and scalar operands are available in the integrated vector/scalar register file, for example, the register file 900 of FIG. 9. Accordingly, a first vector add instruction is issued to perform the first operation, a first scalar add instruction is issued to perform the second operation, and a second vector add instruction is issued to perform the third operation.

As illustrated in FIG. 10C, one or more permute instructions may also be issued between the instructions representing the operations of FIG. 10A. The permute instructions may be configured to rearrange operands in one or more registers of the register file so that operands are sent to the processing lanes of the vector/scalar unit in a desired order. In some embodiments of the invention, the permute instructions may be avoided by providing operand multiplexors at the inputs of the processing lanes of the vector/scalar unit.

Embodiments of the invention disclosed above provide several advantages. For example, load and store instructions are no longer necessary to transfer data between vector and scalar processing units. Because the memory hierarchy is no longer needed as a medium for exchanging data between the vector and scalar processing units the latencies associated with the load and store instructions is avoided. In some embodiments, a permute instruction may be necessary to reorder operands of a register prior to transferring register contents to a processing lane. The permute instructions generally have a significantly lower latency than the load and store instructions.

CONCLUSION

By providing an integrated vector/scalar unit and an integrated vector/scalar register file, embodiments of the invention avoid the long latencies for exchanging data between vector and scalar units, and thereby improve performance.

While the foregoing is directed to embodiments of the present invention, other and further embodiments of the invention may be devised without departing from the basic scope thereof, and the scope thereof is determined by the claims that follow.

What is claimed is:

1. A processor comprising:
a register file comprising a plurality of registers, wherein the plurality of registers configured to store vector and scalar data, wherein each of the plurality of registers comprise one or more sections configured to store an operand selected from a vector operand and a scalar operand; and
a vector processing unit communicably coupled with the register file, the vector processing unit comprising a plurality of pipelined vector processing lanes that includes a multiplier, an aligner, an adder, a normalizer, and a rounder, wherein the plurality of pipelined vector processing lanes are configured to:
determine whether each of a plurality of interconnected triangles representing an object in a three-dimensional scene of a virtual environment is visible to a viewer, wherein each triangle is represented by two associated vectors, wherein determining whether each triangle is visible comprises:
determining a surface normal for the respective triangle by performing a cross product operation between the two vectors associated with the respective triangle, wherein the cross product operation is performed without requiring any data to be exchanged via memory and between: (i) a scalar register file associated with a scalar processing unit and (ii) a vector register file associated with a vector processing unit via memory, thereby avoiding memory access latencies associated with exchanging data between the scalar register file and the vector register file when performing the cross product operation, wherein the cross product operation comprises six scalar multiply instructions, three scalar subtract instructions, three vector multiply instructions, and two vector add instructions, wherein performing the cross product operation comprises:

updating data contained in the register file by executing, in the same cycle, separately issued vector and scalar instructions of the cross product operation; and reordering, in the register file, operands for at least one of the vector and scalar instructions of the cross product operation without requiring any permute instruction and by way of at least one multiplexor provided at an input of at least one of the plurality of pipelined vector processing lanes, wherein the scalar instructions are processed in a predetermined one or more vector processing lanes of the plurality of pipelined vector processing lanes of the vector processing unit; and determining that the respective triangle is visible based upon a determination that the surface normal for the respective triangle points toward the viewer; and upon determining that at least a first triangle is visible to the viewer, render the first triangle, wherein at least a second triangle that is not visible to the viewer is not rendered.

2. The processor of claim 1, wherein at least one vector processing unit is configured to perform one or more intersection tests between a primary ray cast into the three-dimensional scene and at least one of the triangles of the object in the three-dimensional scene.

3. The processor of claim 2, wherein at least one vector processing unit is configured to determine a color for a pixel of a virtual plane, through which the primary ray is cast into the three-dimensional scene, based on at least a light source in the three-dimensional scene and a color of the object.

4. The processor of claim 3, wherein the color for the pixel of the virtual plane is further determined based on at least a secondary ray issued from a point at which the primary ray intersects the object in the three-dimensional scene.

5. The processor of claim 4, wherein a plurality of secondary rays are issued in the three-dimensional scene, wherein the plurality of secondary rays include a shadow ray, a transmitted ray, and a reflected ray, wherein a first secondary ray is issued from the point at which the primary ray intersects the object in the three-dimensional scene, wherein a second secondary ray is issued from a point at which the first secondary ray intersects a second object in the three-dimensional scene, and wherein a third secondary ray is issued from a point at which the second secondary ray intersects a third object in the three-dimensional scene.

6. The processor of claim 5, wherein the shadow ray is issued from an object to a light source in the three-dimensional scene, wherein the transmitted ray is issued from an object having at least one of transparent properties and translucent properties, and wherein the reflected ray is issued from an object having reflective properties.

7. The processor of claim 6, wherein the color for the pixel of the virtual plane is determined based on the plurality of secondary rays.

8. A computer-implemented method, comprising:

determining whether each of a plurality of interconnected triangles representing an object in a three-dimensional scene of a virtual environment is visible to a viewer, wherein each triangle is represented by two associated vectors, and wherein determining whether each triangle is visible comprises:

by operation of one or more computer processors, determining a surface normal for the respective triangle by performing a cross product operation between the two vectors associated with the respective triangle, wherein the cross product operation is performed without requiring any data to be exchanged via memory and between: (i) a scalar register file associated with a scalar processing unit and (ii) a vector register file associated with a vector processing unit via memory, thereby avoiding memory access latencies associated with exchanging data between the scalar register file and the vector register file when performing the cross product operation, wherein the cross product operation comprises six scalar multiply instructions, three scalar subtract instructions, three vector multiply instructions, and two vector add instructions, wherein performing the cross product operation comprises:

issuing a vector instruction of the cross product operation to a vector processing unit of the one or more computer processors, wherein the vector instruction is processed in one or more pipelined vector processing lanes of the vector processing unit configured to process the vector instruction, wherein the one or more pipelined vector processing lanes include a multiplier, an aligner, an adder, a normalizer, and a rounder; and issuing a scalar instruction of the cross product operation to the vector processing unit, wherein the scalar instruction is separate from the vector instruction and is processed in the same cycle as the vector instruction by at least one pipelined vector processing lane of the vector unit configured to process the scalar instruction, such that the vector instruction and the scalar instruction are executed in parallel;

wherein operands for at least one of the vector instruction and the scalar instruction of the cross product operation are reordered in a register file communicably coupled with the vector processing unit, wherein the register file includes a plurality of registers comprising one or more sections configured to store an operand selected from a vector operand and a scalar operand; and determining that the respective triangle is visible based upon a determination that the surface normal for the respective triangle points toward the viewer; and upon determining that at least a first triangle is visible to the viewer, rendering the first triangle, wherein at least a second triangle that is not visible to the viewer is not rendered.

9. The method of claim 8, wherein at least one vector processing unit is configured to perform one or more intersection tests between a primary ray cast into the three-dimensional scene and at least one of the triangles of the object in the three-dimensional scene.

10. The method of claim 9, wherein at least one vector processing unit is configured to determine a color for a pixel of a virtual plane, through which the primary ray is cast into the three-dimensional scene, based on at least a light source in the three-dimensional scene and a color of the object.

11. The method of claim 10, wherein the color for the pixel of the virtual plane is further determined based on at least a secondary ray issued from a point at which the primary ray intersects the object in the three-dimensional scene.

12. The method of claim 11, wherein a plurality of secondary rays are issued in the three-dimensional scene, wherein the plurality of secondary rays include a shadow ray, a transmitted ray, and a reflected ray, wherein a first secondary ray is issued from the point at which the primary ray intersects the object in the three-dimensional scene, wherein a second secondary ray is issued from a point at which the first secondary ray intersects a second object in the three-dimensional scene, and wherein a third secondary ray is issued from a point at which the second secondary ray intersects a third object in the three-dimensional scene.

13. The method of claim 12, wherein the shadow ray is issued from an object to a light source in the three-dimensional scene, wherein the transmitted ray is issued from an object having at least one of transparent properties and translucent properties, and wherein the reflected ray is issued from an object having reflective properties.

14. The method of claim 13, wherein the color for the pixel of the virtual plane is determined based on the plurality of secondary rays.

15. A system comprising a plurality of processors communicably coupled with one another, each processor comprising:

a register file comprising a plurality of registers, wherein the plurality of registers configured to store vector and scalar data, wherein each of the plurality of registers comprise one or more sections configured to store an operand selected from a vector operand and a scalar operand; and a vector processing unit communicably coupled with the register file, the vector processing unit comprising a plurality of pipelined vector processing lanes that includes a multiplier, an aligner, an adder, a normalizer, and a rounder, wherein the plurality of pipelined vector processing lanes are configured to:

determine whether each of a plurality of interconnected triangles representing an object in a three-dimensional scene of a virtual environment is visible to a viewer, wherein each triangle is represented by two associated vectors, wherein determining whether each triangle is visible comprises:

determining a surface normal for the respective triangle by performing a cross product operation between the two vectors associated with the respective triangle, wherein the cross product operation is performed without requiring any data to be exchanged via memory and between: (i) a scalar register file associated with a scalar processing unit and (ii) a vector register file associated with a vector processing unit via memory, thereby avoiding memory access latencies associated with exchanging data between the scalar register file and the vector register file when performing the cross product operation, wherein the cross product operation comprises six scalar multiply instructions, three scalar subtract instructions, three vector multiply instructions, and two vector add instructions, wherein performing the cross product operation comprises:

updating data contained in the register file by executing, in the same cycle, separately issued vector and scalar instructions of the cross product operation; and reordering, in the register file, operands for at least one of the vector and scalar instructions of the cross product operation, wherein the scalar instructions are processed in a predetermined one or more of the plurality of pipelined vector processing lanes of the vector processing unit; and determining that the respective triangle is visible based upon a determination that the surface normal for the respective triangle points toward the viewer; and upon determining that at least a first triangle is visible to the viewer, render the first triangle, wherein at least a second triangle that is not visible to the viewer is not rendered.

16. The system of claim 15, wherein at least one vector processing unit is configured to perform one or more intersection tests between a primary ray cast into the three-dimensional scene and at least one of the triangles of the object in the three-dimensional scene.

17. The system of claim 16, wherein at least one vector processing unit is configured to determine a color for a pixel of a virtual plane, through which the primary ray is cast into the three-dimensional scene, based on at least a light source in the three-dimensional scene and a color of the object.

18. The system of claim 17, wherein the color for the pixel of the virtual plane is further determined based on at least a secondary ray issued from a point at which the primary ray intersects the object in the three-dimensional scene.

19. The system of claim 18, wherein a plurality of secondary rays are issued in the three-dimensional scene, wherein the plurality of secondary rays include a shadow ray, a transmitted ray, and a reflected ray, wherein a first secondary ray is issued from the point at which the primary ray intersects the object in the three-dimensional scene, wherein a second secondary ray is issued from a point at which the first secondary ray intersects a second object in the three-dimensional scene, and wherein a third secondary ray is issued from a point at which the second secondary ray intersects a third object in the three-dimensional scene.

20. The system of claim 19, wherein the shadow ray is issued from an object to a light source in the three-dimensional scene, wherein the transmitted ray is issued from an object having at least one of transparent properties and translucent properties, and wherein the reflected ray is issued from an object having reflective properties.

* * * * *